US012654671B1

(12) United States Patent
Solomon et al.

(10) Patent No.: US 12,654,671 B1
(45) Date of Patent: Jun. 16, 2026

(54) PEDAL MAP COMPENSATION SYSTEM FOR A VEHICLE

(71) Applicant: GM Global Technology Operations LLC, Detroit, MI (US)

(72) Inventors: Matthew Solomon, Macomb, MI (US); Leon O. Cribbins, Dexter, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/215,939

(22) Filed: May 22, 2025

(51) Int. Cl.
*B60W 50/00* (2006.01)
*B60W 10/14* (2012.01)

(52) U.S. Cl.
CPC ............ *B60W 10/14* (2013.01); *B60W 50/00* (2013.01); *B60W 2050/0052* (2013.01); *B60W 2050/0083* (2013.01); *B60W 2510/244* (2013.01); *B60W 2510/246* (2013.01); *B60W 2520/10* (2013.01); *B60W 2540/10* (2013.01)

(58) Field of Classification Search
CPC ................. B60W 10/14; B60W 50/00; B60W 2050/0052; B60W 2050/0083; B60W 2510/244; B60W 2510/246; B60W 2520/10; B60W 2540/10
See application file for complete search history.

(56) References Cited

U.S. PATENT DOCUMENTS

| | | | |
|---|---|---|---|
| 12,370,905 B2 * | 7/2025 | Bolger | ............... B60L 15/2009 |
| 2016/0009269 A1 * | 1/2016 | Zhou | ...................... B60K 6/442 |
| | | | 180/65.23 |
| 2017/0113570 A1 | 4/2017 | Lai | |
| 2021/0402877 A1 * | 12/2021 | Velazquez Alcantar | ..................... |
| | | | B60W 30/18181 |
| 2022/0348202 A1 * | 11/2022 | Ostafew | ............. B60W 40/105 |

FOREIGN PATENT DOCUMENTS

| | | |
|---|---|---|
| GB | 2571323 A | 8/2019 |
| WO | 2025083588 A1 | 4/2025 |

* cited by examiner

*Primary Examiner* — Tisha D Lewis
(74) *Attorney, Agent, or Firm* — Vivacqua Crane, PLLC

(57) ABSTRACT
A pedal map compensation system for a vehicle includes one or more controllers that execute instructions to receive an accelerator pedal position of an accelerator pedal, a vehicle speed signal, and a signal indicating an active driver mode. The controllers select an unmodified pedal map saved in memory based on the active driver mode, where the unmodified pedal map includes a dead pedal region representing an area where the accelerator pedal continues to be depressed without the vehicle generating a corresponding increase in output axle torque. The dead pedal region is created when a raw system torque output is limited by a raw maximum system capacity. The one or more controllers perform filtering and rate limiting with respect to the maximum axle torque output value of the powertrain associated with the at least one system blending input to determine a modified maximum system capacity of a modified pedal map.

20 Claims, 6 Drawing Sheets

FIG. 1

PEDAL MAP COMPENSATION SYSTEM FOR A VEHICLE

INTRODUCTION

The present disclosure relates to a pedal map compensation system that accounts for the torque capability of a vehicle's powertrain system.

A pedal map for a vehicle refers to a table or map that summaries the relationship between an accelerator pedal position and the resulting output that is produced. A typical pedal map includes a first axis that represents the accelerator pedal position, a second axis that represents the vehicle output such as motor speed (for an electric vehicle), engine speed (for an internal combustion engine), or vehicle speed, and a table that includes the resulting axle, engine, or motor torque. Pedal map shaping refers to modifying the relationship between the accelerator pedal position and the resulting output to optimize or adjust for various factors such as, for example, power delivery, fuel efficiency, and driver feel.

It is to be appreciated that the output torque capabilities of a vehicle's powertrain are not taken into consideration when shaping a pedal map. For example, electric and hybrid vehicles may experience limited powertrain torque output caused by discharge limits associated with the vehicle's rechargeable energy storage system (RESS). The discharge limits depend upon a variety of factors such as, for example, the state-of-charge and temperature of the vehicle's battery pack. When these factors limit torque output, a driver may experience an event that is sometimes referred to as dead pedal. Dead pedal occurs when a driver continues to depress the accelerator pedal without experiencing a corresponding increase in axle torque due to torque saturation, which is when the pedal map requests more torque than the vehicle is capable of delivering at higher pedal accelerator inputs.

Thus, while pedal maps achieve their intended purpose, there is a need in the art for an improved approach to reduce dead pedal by shaping the pedal map based on the torque capability of a vehicle's powertrain system.

SUMMARY

According to several aspects, a pedal map compensation system for a vehicle is disclosed. The pedal map compensation system includes one or more controllers that include one or more processors that execute instructions to receive an accelerator pedal position of an accelerator pedal, a vehicle speed signal, and a signal indicating an active driver mode of the vehicle. The one or more controllers select an unmodified pedal map saved in memory based on the active driver mode, where the unmodified pedal map includes a dead pedal region representing an area of a raw system torque output where the accelerator pedal continues to be depressed without the vehicle generating a corresponding increase in output axle torque. The dead pedal region is created when the raw system torque output is limited by a raw maximum system capacity of the unmodified pedal map. The one or more controllers receive at least one system blending input that depends upon a specific powertrain configuration of the vehicle, where each system blending input is associated with a maximum axle torque output value of a powertrain of the vehicle. The one or more controllers perform filtering and rate limiting with respect to the maximum axle torque output value of the powertrain associated with the at least one system blending input to determine a modified maximum system capacity of a modified pedal map. The one or more controllers receive input indicating a calibratable lower split point and a calibratable upper split point of a modified system output of the modified pedal map, where a distance measured between the calibratable lower split point and the calibratable upper split point of the modified system output of the modified pedal map represents a region where a profile of the raw system torque output of the unmodified pedal map is shaped to reduce the dead pedal region. The one or more controllers limit the modified system output of the modified pedal map based on a maximum torque limit of the powertrain, one or more hardware protection limits, and one or more maximum powertrain system limits, and instruct the powertrain of the vehicle to generate output axle torque as defined by the modified pedal map.

In another aspect, the one or more controllers execute instructions to: receiving a signal indicating one pedal driving is selected by a driver of the vehicle.

In yet another aspect, the one or more controllers execute instructions to: in response to receiving the signal indicating one pedal driving is selected, decrease the value of a zero pedal torque of the modified pedal map.

In an aspect, the modified pedal map includes an x-axis representing an accelerator pedal position and a y-axis representing the output axle torque.

In another aspect, the calibratable lower split point of the modified system output is selected so an x-axis value corresponding to the accelerator pedal position of the modified pedal map is greater than a normal accelerator pedal operating range.

In yet another aspect, the calibratable upper split point of the modified system output is selected so as not to exceed a flattening point of a raw axle torque output request of the powertrain.

In an aspect, the distance between the calibratable lower split point and the calibratable upper split point along the modified system output is shaped to include one of the following: a linear shaping profile and a non-linear shaping profile.

In another aspect, the vehicle is a battery electric vehicle (BEV) and the at least one system blending input includes a state-of-charge and a temperature of a rechargeable battery pack.

In yet another aspect, the vehicle includes an internal combustion engine and the at least one system blending input includes altitude and at least one of the following: engine coolant temperature and engine intake temperature.

In an aspect, the vehicle is a hybrid vehicle and the at least one system blending input includes a state-of-charge of a rechargeable battery pack, a temperature of the rechargeable battery pack, altitude, engine coolant temperature, and engine intake temperature.

In another aspect, the at least one system blending input includes more than one input, and wherein the one or more controllers execute instructions to: select the system blending input associated with a lowest maximum axle torque output value of the powertrain of the vehicle.

In yet another aspect, the one or more controllers perform the filtering and rate limiting by: applying a time-based rate limit to an unfiltered profile of the maximum axle torque output value of the powertrain associated with the at least one system blending input to determine a rate limited signal, and filtering the rate limited signal to determine a filtered, rate limited signal, where the modified maximum system capacity is equal to the filtered, rate limited signal.

In an aspect, the one or more controllers execute instructions to: compare the filtered, rate limited signal with the calibratable lower split point of the modified pedal map, and in response to determining the filtered, rate limited signal is less than the calibratable lower split point of the modified pedal map, utilize the raw system torque output of the unmodified pedal map.

In another aspect, the one or more controllers execute instructions to: compare the filtered, rate limited signal with the raw maximum system capacity of the unmodified pedal map, and in response to determining the filtered, rate limited signal is greater than the raw maximum system capacity of the unmodified pedal map, utilize the raw system torque output of the unmodified pedal map instead of the modified system output.

In yet another aspect, a pedal map compensation system for a vehicle is disclosed. The pedal map compensation system includes one or more controllers that include one or more processors that execute instructions to receive an accelerator pedal position of an accelerator pedal, a vehicle speed signal, and a signal indicating an active driver mode of the vehicle. The one or more controllers select an unmodified pedal map saved in memory based on the active driver mode, where the unmodified pedal map includes a dead pedal region representing an area of a raw system torque output where the accelerator pedal continues to be depressed without the vehicle generating a corresponding increase in output axle torque, and where the dead pedal region is created when the raw system torque output is limited by a raw maximum system capacity of the unmodified pedal map. The one or more controllers receive at least one system blending input that depends upon a specific powertrain configuration of the vehicle, where each system blending input is associated with a maximum axle torque output value of a powertrain of the vehicle. The one or more controllers perform filtering and rate limiting with respect to the maximum axle torque output value of the powertrain associated with the at least one system blending input to determine a modified maximum system capacity of a modified pedal map. The one or more controllers receive input indicating a calibratable lower split point and a calibratable upper split point of a modified system output of the modified pedal map, where a distance measured between the calibratable lower split point and the calibratable upper split point of the modified system output of the modified pedal map represents a region where a profile of the raw system torque output of the unmodified pedal map is shaped to reduce the dead pedal region. The one or more controllers receive a signal indicating one pedal driving is selected by a driver of the vehicle, and in response to receiving the signal indicating one pedal driving is selected, decrease the value of a zero pedal torque of the modified pedal map. The one or more controllers limit the modified system output of the modified pedal map based on a maximum torque limit of the powertrain, one or more hardware protection limits, and one or more maximum powertrain system limits, and instruct the powertrain of the vehicle to generate output axle torque as defined by the modified pedal map.

In an aspect, the one or more controllers perform the filtering and rate limiting by: applying a time-based rate limit to an unfiltered profile of the maximum axle torque output value of the powertrain associated with the at least one system blending input to determine a rate limited signal, and filtering the rate limited signal to determine a filtered, rate limited signal, where the modified maximum system capacity is equal to the filtered, rate limited signal.

In another aspect, the one or more controllers execute instructions to: compare the filtered, rate limited signal with the calibratable lower split point of the modified pedal map, and in response to determining the filtered, rate limited signal is less than the calibratable lower split point of the modified pedal map, utilize the raw system torque output of the unmodified pedal map.

In yet another aspect, the one or more controllers execute instructions to: compare the filtered, rate limited signal with the raw maximum system capacity of the unmodified pedal map, and in response to determining the filtered, rate limited signal is greater than the raw maximum system capacity of the unmodified pedal map, utilize the raw system torque output of the unmodified pedal map instead of the modified system output.

In an aspect, the vehicle is a BEV and the at least one system blending input includes a state-of-charge and a temperature of a rechargeable battery pack.

In another aspect, a pedal map compensation system for a vehicle is disclosed. The pedal map compensation system includes one or more controllers that include one or more processors that execute instructions to receive an accelerator pedal position of an accelerator pedal, a vehicle speed signal, and a signal indicating an active driver mode of the vehicle. The one or more controllers select an unmodified pedal map saved in memory based on the active driver mode, where the unmodified pedal map includes a dead pedal region representing an area of a raw system torque output where the accelerator pedal continues to be depressed without the vehicle generating a corresponding increase in output axle torque. The dead pedal region is created when the raw system torque output is limited by a raw maximum system capacity of the unmodified pedal map. The one or more controllers receive at least one system blending input that depends upon a specific powertrain configuration of the vehicle, where each system blending input is associated with a maximum axle torque output value of a powertrain of the vehicle. The one or more controllers perform filtering and rate limiting with respect to the maximum axle torque output value of the powertrain associated with the at least one system blending input to determine a modified maximum system capacity of a modified pedal map, where the one or more controllers perform the filtering and rate limiting by: applying a time-based rate limit to an unfiltered profile of the maximum axle torque output value of the powertrain associated with the at least one system blending input to determine a rate limited signal, and filtering the rate limited signal to determine a filtered, rate limited signal, where the modified maximum system capacity is equal to the filtered, rate limited signal. The one or more controllers receive input indicating a calibratable lower split point and a calibratable upper split point of a modified system output of the modified pedal map, where a distance measured between the calibratable lower split point and the calibratable upper split point of the modified system output of the modified pedal map represents a region where a profile of the raw system torque output of the unmodified pedal map is shaped to reduce the dead pedal region. The one or more controllers receive a signal indicating one pedal driving is selected by a driver of the vehicle. In response to receiving the signal indicating one pedal driving is selected, the one or more controllers decrease the value of a zero pedal torque of the modified pedal map. The one or more controllers limit the modified system output of the modified pedal map based on a maximum torque limit of the powertrain, one or more hardware protection limits, and one or more maximum powertrain system limits, and instruct the powertrain of the vehicle to generate output axle torque as defined by the modified pedal map.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 illustrates a schematic diagram of a vehicle including the disclosed pedal map compensation system that includes one or more controllers, according to an exemplary embodiment;

DETAILED DESCRIPTION

Figure 2:
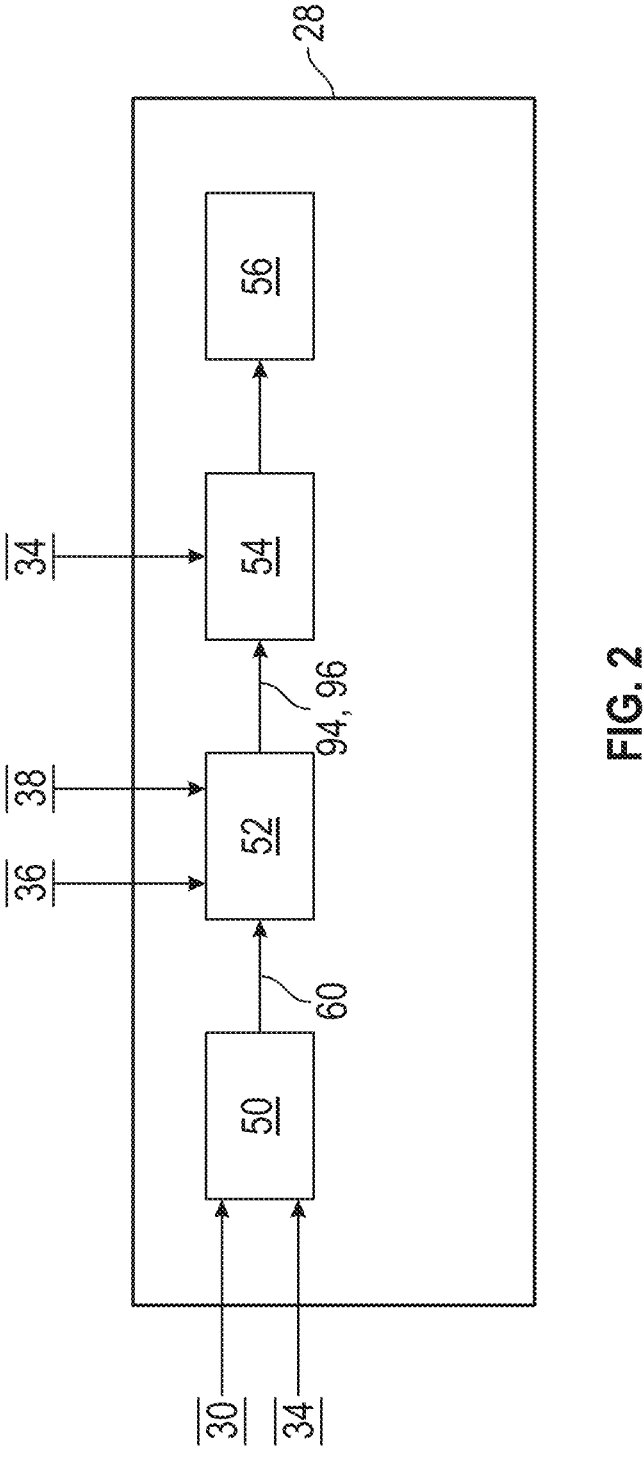
FIG. 2 illustrates the software architecture of the one or more controllers shown in FIG. 1, according to an exemplary embodiment.

The following description is merely exemplary in nature and is not intended to limit the present disclosure, application, or uses.

Figure 1:
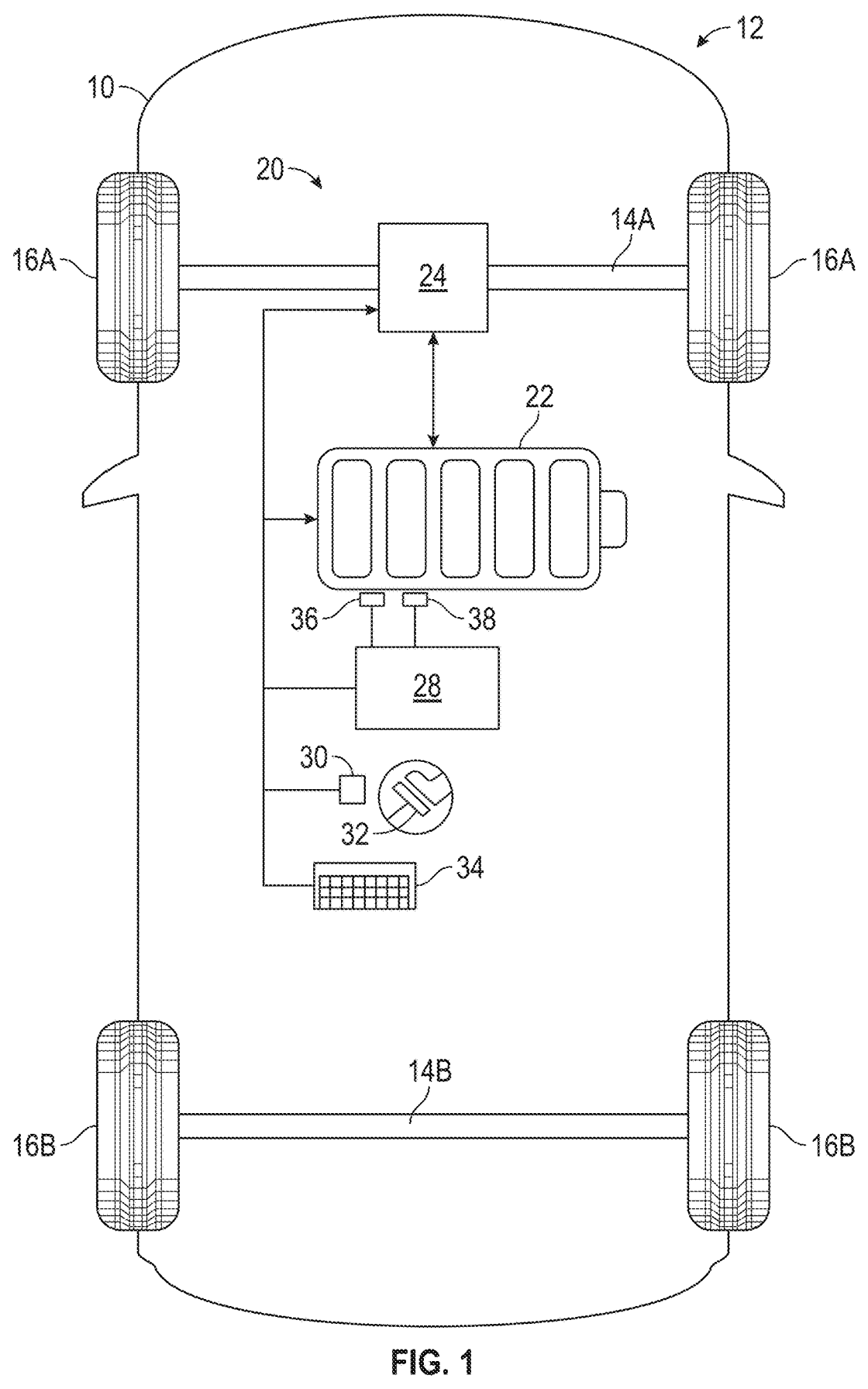

Referring to FIG. 1, schematic diagram of a vehicle 10 including a pedal map compensation system 12 is illustrated. It is to be appreciated that the vehicle 10 may be any type of vehicle such as, but not limited to, a sedan, a coupe, a truck, sport utility vehicle, van, or motor home. The vehicle 10 includes a front axle 14A connected to a set of front wheels 16A and a rear axle 14B connected to a set of rear wheels 16B. In the non-limiting embodiment as shown in FIG. 1, the vehicle 10 is a battery electric vehicle (BEV) having a powertrain 20 that includes a rechargeable battery pack 22 that provides power to an electric motor 24. Specifically, FIG. 1 illustrates power distributed to the front wheels 16A of the vehicle 10 by an electric motor 24 corresponding to the front axle 14A. However, it is to be appreciated that FIG. 1 is merely exemplary in nature and other configurations with additional electric motors are contemplated. For example, in an alternative embodiment, the vehicle 10 may include an electric motor 24 corresponding to the rear axle 14B instead. In yet another embodiment, electric motors 24 corresponding to both the front axle 14A and the rear axle 14B may be included as well. Furthermore, it is also to be appreciated that the vehicle 10 is not limited to a BEV and may include any type of vehicle where torque output may be limited such as, for example, a hybrid vehicle or a vehicle including only an internal combustion engine.

The pedal map compensation system 12 includes one or more controllers 28 in electronic communication with the rechargeable battery pack 22, the electric motor 24, an accelerator pedal sensor 30 that monitors an accelerator pedal position of an accelerator pedal 32, a user input 34, one of more state-of-charge (SOC) sensors 36 corresponding to the rechargeable battery pack 22, and one or more temperature sensors 38 corresponding to the rechargeable battery pack 22. It is to be appreciated that the state-of-charge and temperature may be measured by physical sensors or inferred from computer model data based on physical sensors. The user input 34 is any type of device for receiving user input generated by an occupant the vehicle 10 such as, for example, a touchscreen, a keypad, or a microphone. In one non-limiting embodiment, the user input 34 is part of an infotainment system of the vehicle 10. The user input 34 may receive input from an occupant of the vehicle 10 indicating an active driver mode. The active driver mode indicates a pre-set configuration for modified or enhanced driving performance such as, but not limited to, a relaxed mode, a touring mode, a sport mode, and a maximum performance mode. In embodiments, the user input 34 may receive input from an occupant of the vehicle 10 indicating one pedal driving is selected.

FIG. 2 illustrates the software architecture of the one or more controllers 28 shown in FIG. 1. Referring to both FIGS. 1 and 2, the one or more controllers 28 include a pedal map lookup module 50, a blending block 52, a zero pedal torque blending block 54, and a constraint block 56. The pedal map lookup module 50 of the one or more controllers 28 receives the accelerator pedal position of the accelerator pedal 32 (FIG. 1) from the accelerator pedal sensor 30 (FIGS. 1 and 2), a vehicle speed signal that indicates the vehicle speed, and a signal indicating the active driver mode from the user input 34. In response to receiving the accelerator pedal position of the accelerator pedal 32, the vehicle speed signal, and the signal indicating the active driver mode, the pedal map lookup module 50 selects an unmodified pedal map 60 (shown in FIG. 3) saved in the memory of the one or more controllers 28 based on the active driver mode.

Figure 3:
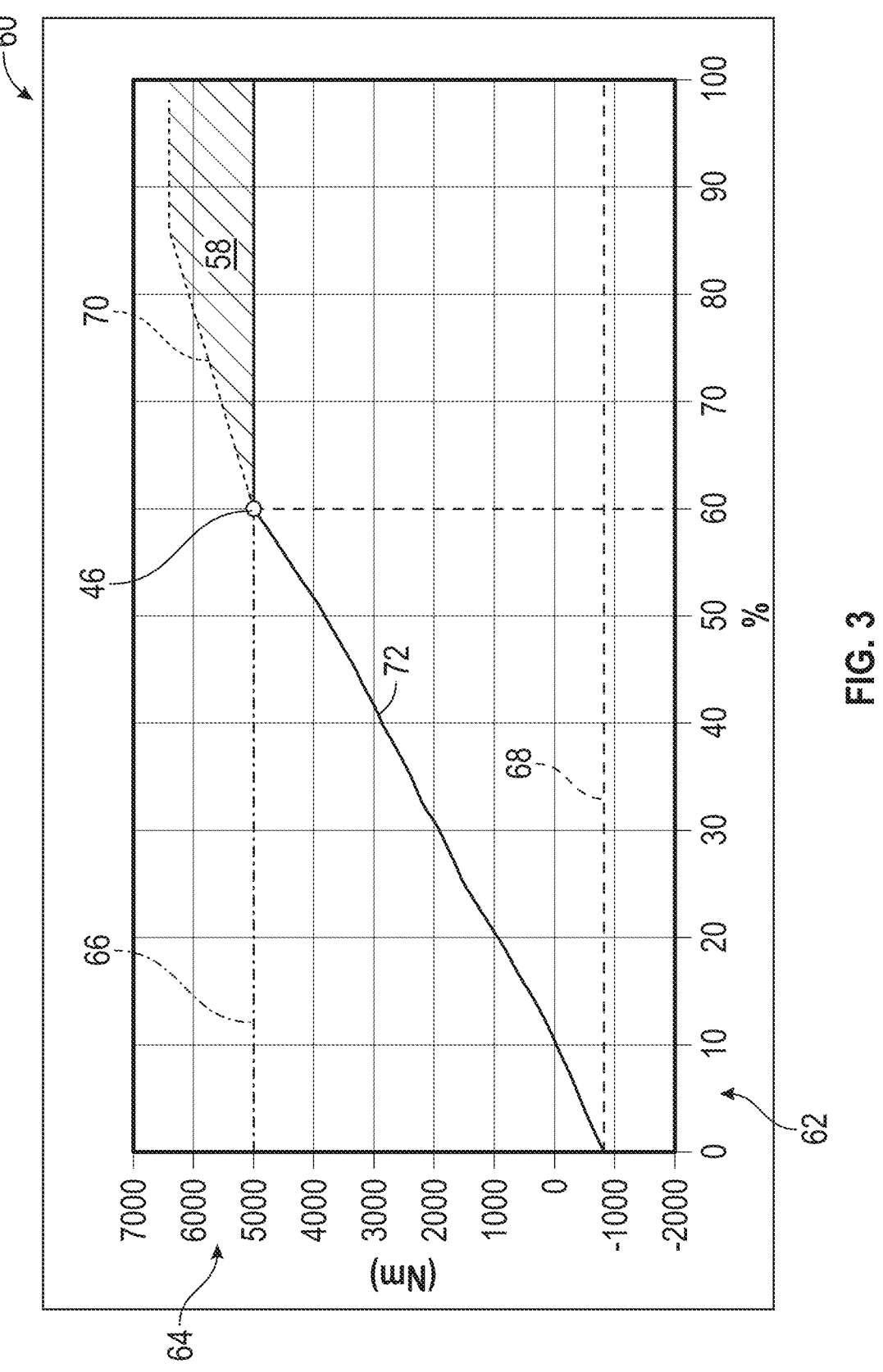
FIG. 3 illustrates an exemplary unmodified pedal map that has not been shaped by the pedal map compensation system, according to an exemplary embodiment.

FIG. 3 illustrates an exemplary unmodified pedal map 60 that has not been shaped by the pedal map compensation system 12 (FIG. 1). The unmodified pedal map 60 includes an x-axis 62 that represents an accelerator pedal position that is expressed as a percentage and a y-axis 64 that represents output axle torque in Newton-meters (Nm). Although not illustrated, it is to be appreciated that the unmodified pedal map 60 also includes a vertical or z-axis that represents the vehicle speed. The unmodified pedal map 60 plots a raw maximum system capacity 66, a raw zero pedal torque 68, a raw axle torque output request 70, and a raw system torque output 72.

In the non-limiting example as shown in FIG. 3, the raw system torque output 72 linearly increases in value from the raw zero pedal torque 68 that is created at zero percent accelerator pedal position until reaching a maximum calibration point 46, which represents a point where the system output is limited by the raw maximum system capacity 66, which is located at sixty percent accelerator pedal position. As seen in FIG. 3, once the raw system torque output 72 reaches the maximum calibration point 46 at the raw maximum system capacity 66, a driver may continue to depress the accelerator pedal 32 (FIG. 1) but will not experience a corresponding increase in axle torque because of torque saturation. In other words, the unmodified pedal map 60 includes a dead pedal region 58 that represents an area of the raw system torque output 72 where the accelerator pedal 32 continues to be depressed without the vehicle 10 generating a corresponding increase in output axle torque. The dead pedal region 58 is created when the raw system torque output 72 is limited by the raw maximum system capacity 66. As explained below, the pedal map compensation system 12 (FIG. 1) shapes the raw system torque output 72 of the unmodified pedal map 60 to reduce the range of the dead pedal region 58.

Referring to FIGS. 1, 2, and 3, the one or more controllers 28 store a plurality of pedal maps in memory that each include a raw system torque output 72 (FIG. 3) that varies based on the active driver mode of the vehicle 10. It is also to be appreciated that some pedal maps may be shared between different active driver modes. The pedal map lookup module 50 of the one or more controllers 28 selects the unmodified pedal map 60 based on the active driver mode and transmits the selected unmodified pedal map 60 to the blending block 52 of the one or more controllers 28. The blending block 52 of the one or more controllers 28 also receives at least one system blending input that depends upon the specific powertrain configuration of the vehicle 10.

In the example as shown in FIG. 1, the vehicle 10 is a BEV and the at least one system blending input includes the state-of-charge of the rechargeable battery pack 22 received from the one of more state-of-charge sensors 36 and a temperature of the rechargeable battery pack 22 from the one or more temperature sensors 38. In the event the powertrain 20 is part of a vehicle that includes an internal combustion engine, then the at least one system blending inputs include altitude and/or at least one of the following: engine coolant temperature and engine intake temperature. In the event the powertrain 20 is part of a hybrid vehicle, then the at least one system blending input includes the state-of-charge of the rechargeable battery pack 22, the temperature of the rechargeable battery pack 22, the altitude, the engine coolant temperature, and the engine intake temperature. Each system blending input is associated with a maximum axle torque output value of the powertrain 20 of the vehicle 10. Although a maximum axle torque output value is described, it is to be appreciated that motor torque and engine torque may be used as well.

In the event the at least one system blending input includes more than one input, the blending block 52 of the one or more controllers 28 selects the system blending input associated with the lowest maximum axle torque output value of the powertrain 20 of the vehicle 10. In other words, the blending block 52 selects the system blending input associated that the lowest maximum axle torque output valve of the powertrain 20 when compared to the other system blending inputs. Otherwise, the blending block 52 of the one or more controllers 28 selects the single system blending input.

Figure 4:
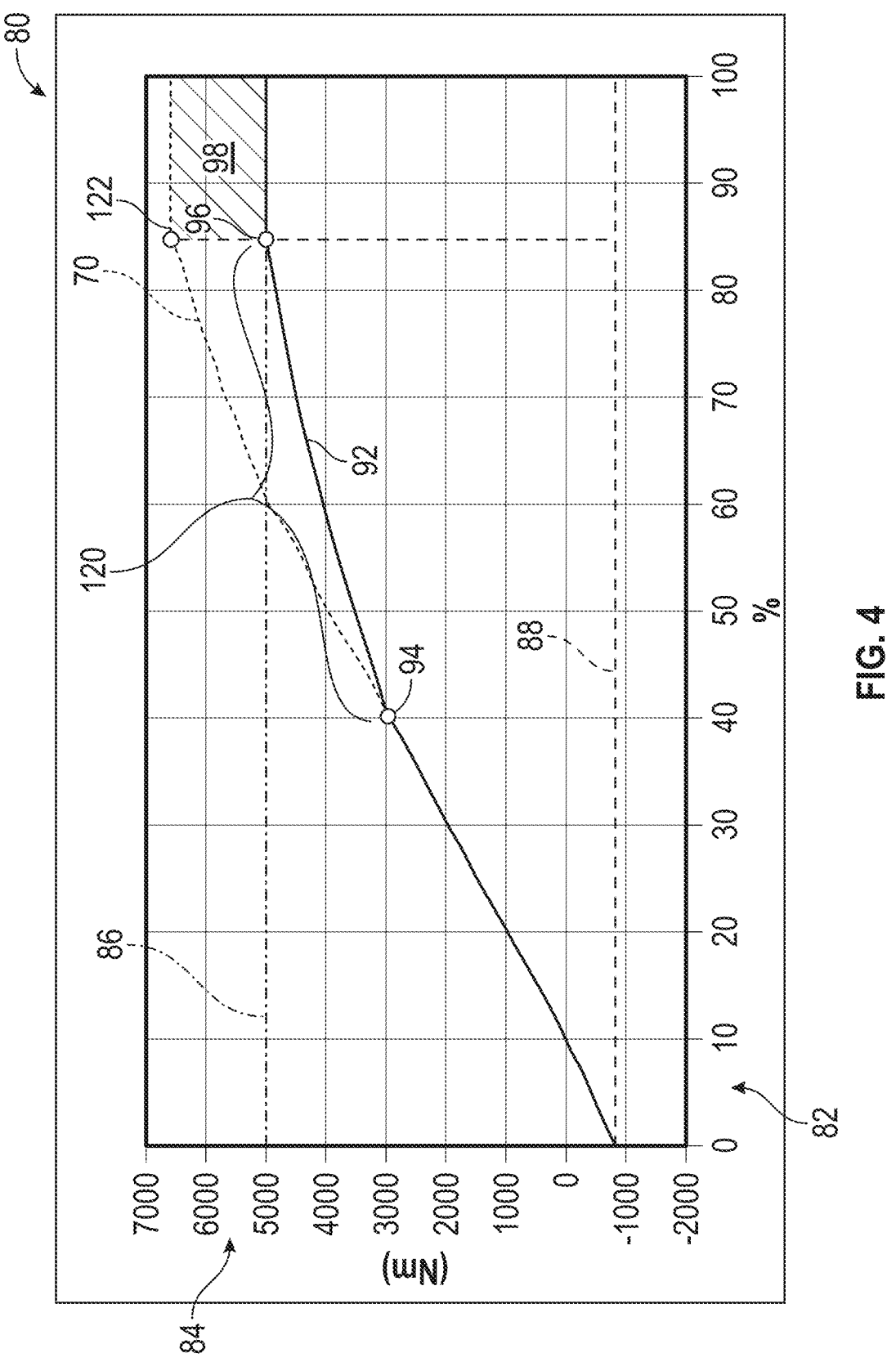
FIG. 4 is an illustration of a modified pedal map that is created by shaping the unmodified pedal map shown in FIG. 3, according to an exemplary embodiment.

FIG. 4 is an illustration of a modified pedal map 80 that is created by shaping the unmodified pedal map 60 shown in FIG. 3. The modified pedal map 80 includes an x-axis 82 that represents the accelerator pedal position that is expressed as a percentage and a y-axis 84 that represents the output axle torque. The modified pedal map 80 plots a modified maximum system capacity 86, a zero pedal torque 88, the raw axle torque output request 70, and a modified system output 92. The modified system output 92 includes a calibratable lower split point 94 and a calibratable upper split point 96. In the non-limiting embodiment as shown in FIG. 4, the calibratable lower split point 94 is located at an accelerator pedal position of forty percent and the calibratable upper split point 96 is located at an accelerator pedal position of eighty five percent. As explained below, the pedal map compensation system 12 shapes the raw system torque output 72 of the unmodified pedal map 60 (shown in FIG. 3) to create the modified system output 92 shown in FIG. 4, which includes a reduced dead pedal region 98.

Figure 5:
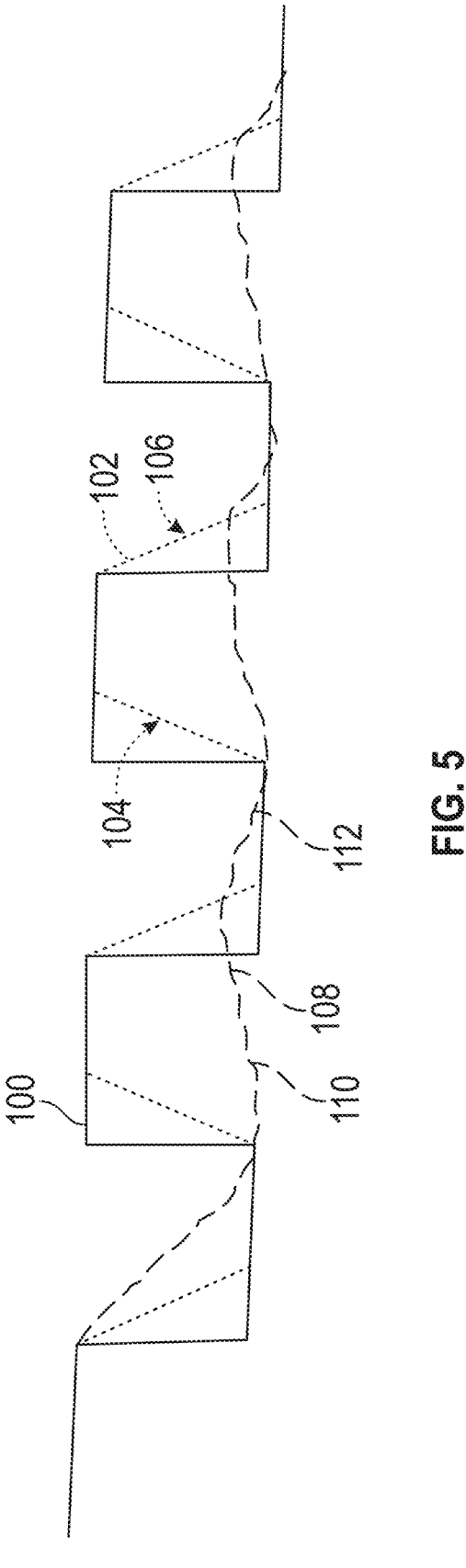
FIG. 5 illustrates filtering and rate limiting with respect to a maximum axle torque output value of the powertrain associated with a system blending input, according to an exemplary embodiment.

Referring to FIGS. 2 and 4, the blending block 52 of the one or more controllers 28 performs filtering and rate limiting with respect to the maximum axle torque output value of the powertrain 20 associated with the at least one system blending input to determine the modified maximum system capacity 86 of the modified pedal map 80. Referring to FIG. 5, the maximum axle torque output value of the powertrain 20 associated with the at least one system blending input is represented by an unfiltered profile 100, which is drawn as a square wave. It is to be appreciated that although the unfiltered profile 100 is shown as a perfect square wave, this is merely done for purposes of simplicity and ease of illustration, and the unfiltered profile 100 is not a perfect square wave.

Referring to FIGS. 1, 2, and 5, the blending block 52 of the one or more controllers 28 performs the filtering and rate limiting by first applying a time-based rate limit to the unfiltered profile 100 of the maximum axle torque output value of the powertrain 20 associated with the at least one system blending input to determine a rate limited signal 102. Specifically, the rate limited signal 102 includes a rising rate limit 104 that defines how fast the maximum axle torque output value of the powertrain 20 associated with the at least one system blending input may increase in value. The rate limited signal 102 also includes a falling rate limit 106 that defines how fast the maximum axle torque output value of the powertrain 20 associated with the at least one system blending input may decrease in value. The rate limit is determined based on system metrics that define the rate at which the vehicle 10 may change acceleration without a driver request. Merely by way of example, in one embodiment the rate limit is 1.96 meters per second squared ($m/s^2$) in 0.2 seconds. It is to be appreciated that the blending block 52 of the one or more controllers 28 performs the filtering and rate limiting to prevent toggling of the output torque if the system inputs corrupt or otherwise change rapidly.

The blending block 52 of the one or more controllers 28 then filters the rate limited signal 102 to determine a filtered, rate limited signal 108. In one embodiment, the filtering is customizable depending upon a direction of travel of the rate limited signal 102. In the example as shown in FIG. 5, the filtering is customized based on the direction of travel of the rate limited signal 102 so that a rising rate limit 110 increases more slowly when compared to a falling rate limit 112 of the filtered, rate limited signal 108. Referring to FIGS. 2, 4, and 5, the blending block 52 of the one or more controllers 28 then sets the modified maximum system capacity 86 equal to the filtered, rate limited signal 108.

Referring to FIGS. 2 and 4, the blending block 52 of the one or more controllers 28 may then receive input indicating the calibratable lower split point 94 and the calibratable upper split point 96 that are disposed along the modified system output 92. The input may be user-generated input, or the calibratable lower split point 94 and the calibratable upper split point 96 may be saved in tabular form within the memory of the one or more controllers 28. A distance 120 measured between the calibratable lower split point 94 and the calibratable upper split point 96 along the modified system output 92 of the modified pedal map 80 (FIG. 4) represents a region where a profile of the raw system torque output 72 of the unmodified pedal map 60 (FIG. 3) is shaped to reduce the dead pedal region 58. Specifically, the distance 120 between the calibratable lower split point 94 and the calibratable upper split point 96 along the modified system output 92 is shaped to include either a linear shaping profile or a non-linear shaping profile. The non-linear shaping profiles may include parabolic or exponential profiles. In the event the input is user-generated, it is to be appreciated that the blending block 52 would place bounds on the calibratable lower and upper split points 94, 96 to ensure enough distance 120 between the two points as well as to place a minimum value on the calibratable lower split point 94.

In the non-limiting embodiment as shown, the calibratable lower split point 94 of the modified system output 92 is selected so that the x-axis 82 value corresponding to the accelerator pedal position of the modified pedal map 80 is greater than the normal accelerator pedal operating range. The normal accelerator pedal operating range represents where the accelerator pedal 32 (FIG. 1) spends about ninety percent of the time when the vehicle 10 operates under normal city or highway driving conditions. The calibratable upper split point 96 of the modified system output 92 is selected so as not to exceed a flattening point 122 of the raw axle torque output request 70 of the powertrain 20 of the vehicle 10. The flattening point 122 of the raw axle torque output request 70 represents where the raw axle torque output request 70 flattens its profile. The calibratable upper split point 96 of the modified system output 92 is also selected to reduce the dead pedal region 98 of the modified pedal map 80. It is to be appreciated that although FIG. 4 illustrates the calibratable upper split point 96 of the modified system output 92 located at eighty five percent accelerator pedal position, the calibratable upper split point 96 may be located at one hundred percent accelerator pedal position to eliminate the dead pedal, however, this may affect drive quality.

The distance 120 measured between the calibratable lower split point 94 and the calibratable upper split point 96 results in a gradual increase in the modified system output 92 and is chosen so as to minimize any adverse impact to drive quality, which is the tendency of the response of the system to match the expectations of a driver of the vehicle 10. In one embodiment, the drive quality may be measured based on a rate of change in acceleration when the accelerator pedal position crosses the calibratable lower split point 94 of the modified pedal map 80 at the modified maximum system capacity 86. It is to be appreciated that changes in the shape of the torque output that are too abrupt for a given change in input may negatively impact drive quality.

Referring to FIGS. 2, 4 and 5, it is to be appreciated that the the blending block 52 of the one or more controllers 28 compares the filtered, rate limited signal 108 (FIG. 5) with the calibratable lower split point 94 of the modified pedal map 80. In response to determining the filtered, rate limited signal 108 is less than the calibratable lower split point 94 of the modified pedal map 80, the blending block 52 of the one or more controllers 28 utilizes the raw axle torque output request 70, which is the raw system torque output 72 of the unmodified pedal map 60 (shown in FIG. 3) instead of the modified system output 92 shown in FIG. 4. Similarly, the blending block 52 of the one or more controllers 28 compares the filtered, rate limited signal 108 with the raw maximum system capacity 66 of the unmodified pedal map 60. In response to determining the filtered, rate limited signal 108 is greater than a maximum value of the raw axle torque output request 70, which is located at the flattening point 122 in FIG. 4, the blending block 52 of the one or more controllers 28 utilizes the raw axle torque output request 70, which is the the raw system torque output 72 of the unmodified pedal map 60 (shown in FIG. 3) instead of the modified system output 92 shown in FIG. 4.

Figure 6:
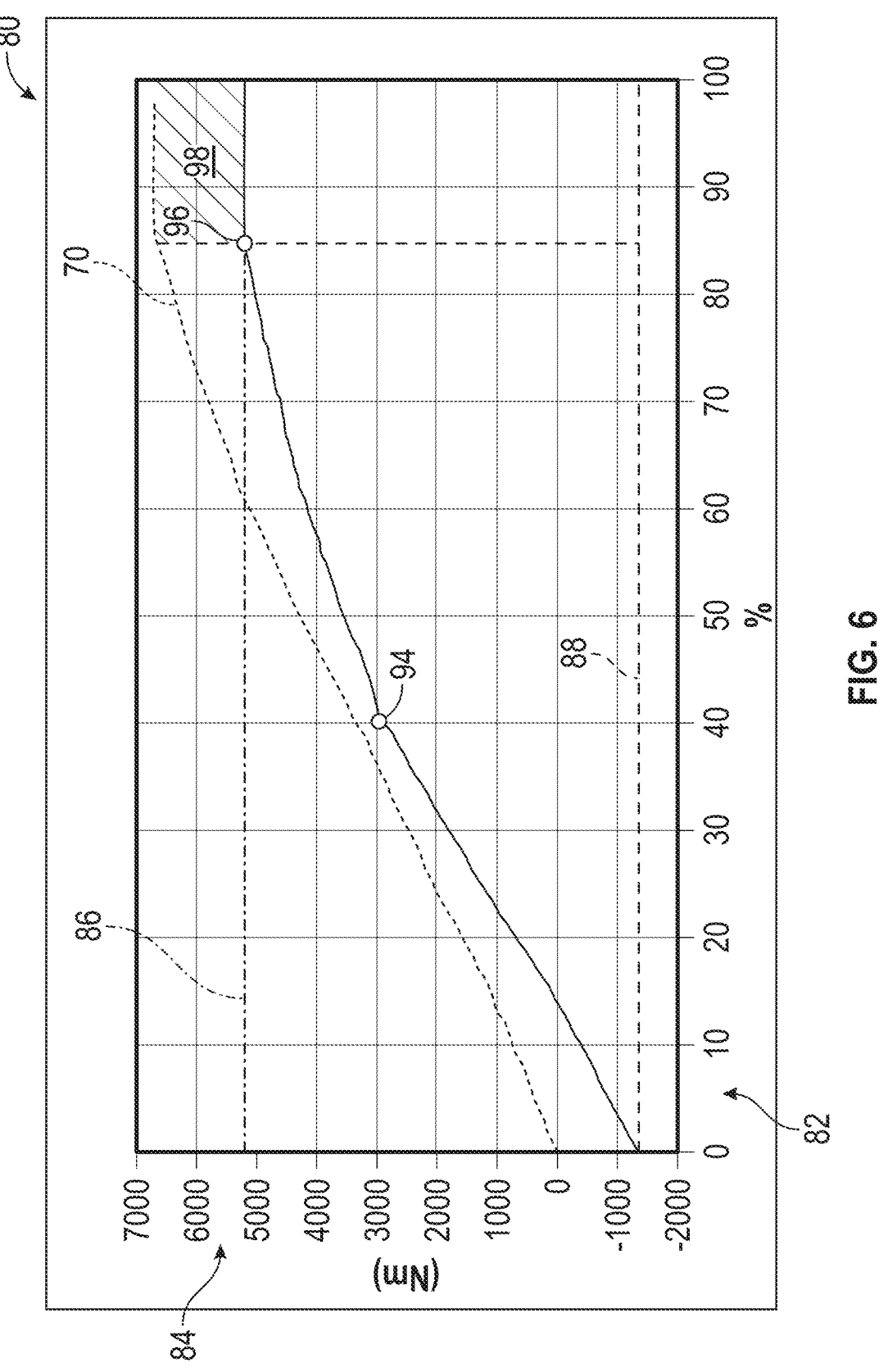
FIG. 6 is an illustration of the modified pedal map shown in FIG. 4 where one pedal driving is selected, according to an exemplary embodiment.

FIG. 6 is an illustration of the modified pedal map 80 where one pedal driving has been activated by a driver of the vehicle 10. Referring to FIGS. 2, 4, and 6, in response to receiving a signal indicating one pedal driving is selected from the user input 34, the zero pedal torque blending block 54 of the one or more controllers 28 decrease the value of the zero pedal torque 88. For example, in the embodiment as shown in FIGS. 4 and 6, when one pedal driving is selected, the value of the zero pedal torque 88 of the modified pedal map 80 changes from about −900 Nm to about −2100 Nm. The zero pedal torque blending block 54 of the one or more controllers 28 then shapes the modified system output 92 of the modified pedal map 80 based on a decreased value of the zero pedal torque 88.

Referring to FIGS. 1 and 2, the constraint block 56 of the one or more controllers 28 receives a maximum torque limit of the powertrain 20 (FIG. 1), one or more hardware protection limits, and one or more maximum powertrain system limits. Some examples of hardware protection limits include, but are not limited to, a maximum hardware torque limit of the front and rear axles 14A, 14B and the maximum hardware torque output of the electric motor 24. The one or more maximum powertrain system limits include state-of-charge limits for the rechargeable battery pack 22 (FIG. 1), temperature limits of the rechargeable battery pack 22, capability limits of the electric motor 24 (FIG. 1), or capability limits of an internal combustion engine, if applicable.

The constraint block 56 of the one or more controllers 28 limit the modified system output 92 of the modified pedal map 80 based on the maximum torque limit of the powertrain 20, the one or more hardware protection limits, and the one or more maximum powertrain system limits. For example, if the maximum hardware torque limit of the front axle 14A is less than the modified maximum system capacity 86, then the constraint block 56 of the one or more controllers 28 may reduce the modified maximum system capacity 86 to be equal to the maximum hardware torque limit of the front axle 14A. Thus, the modified system output 92 would be clipped or limited at the maximum hardware torque limit of the front axle 14A. The one or more controllers 28 then instruct the powertrain 20 of the vehicle 10 to generate output axle torque as defined by the modified pedal map 80.

Referring generally to the figures, the disclosed pedal map compensation system provides various technical effects and benefits. Specifically, the pedal map compensation system improves drive quality by providing a wider range of accelerator pedal positions when the system capacity of the vehicle's powertrain is limited. For example, electric and hybrid vehicles may experience limited powertrain torque output caused by discharge limits associated with the vehicle's rechargeable energy storage system (RESS), which may result in a driver experiencing dead pedal. The pedal map compensation system provides an approach to improve pedal response and range when system capacity limits adversely affect maximum torque output.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A pedal map compensation system for a vehicle, the pedal map compensation system comprising:

one or more controllers that include one or more processors that execute instructions to:

receive an accelerator pedal position of an accelerator pedal, a vehicle speed signal, and a signal indicating an active driver mode of the vehicle;

select an unmodified pedal map saved in memory of the controller based on the active driver mode, wherein the unmodified pedal map includes a dead pedal region representing an area of a raw system torque output where the accelerator pedal continues to be depressed without the vehicle generating a corresponding increase in output axle torque, and wherein the dead pedal region is created when the raw system torque output is limited by a raw maximum system capacity of the unmodified pedal map;

receive at least one system blending input that depends upon a specific powertrain configuration of the vehicle, wherein each system blending input is associated with a maximum axle torque output value of a powertrain of the vehicle;

perform filtering and rate limiting with respect to the maximum axle torque output value of the powertrain associated with the at least one system blending input to determine a modified maximum system capacity of a modified pedal map;

receive input indicating a calibratable lower split point and a calibratable upper split point of a modified system output of the modified pedal map, wherein a distance measured between the calibratable lower split point and the calibratable upper split point of the modified system output of the modified pedal map represents a region where a profile of the raw system torque output of the unmodified pedal map is shaped to reduce the dead pedal region;

limit the modified system output of the modified pedal map based on a maximum torque limit of the powertrain, one or more hardware protection limits, and one or more maximum powertrain system limits; and instruct the powertrain of the vehicle to generate output axle torque as defined by the modified pedal map.

2. The pedal map compensation system of claim 1, wherein the one or more controllers execute instructions to:

receiving a signal indicating one pedal driving is selected by a driver of the vehicle.

3. The pedal map compensation system of claim 2, wherein the one or more controllers execute instructions to:

in response to receiving the signal indicating one pedal driving is selected, decrease a value of a zero pedal torque of the modified pedal map.

4. The pedal map compensation system of claim 1, wherein the modified pedal map includes an x-axis representing an accelerator pedal position and a y-axis representing the output axle torque.

5. The pedal map compensation system of claim 4, wherein the calibratable lower split point of the modified system output is selected so an x-axis value corresponding to the accelerator pedal position of the modified pedal map is greater than a normal accelerator pedal operating range.

6. The pedal map compensation system of claim 4, wherein the calibratable upper split point of the modified system output is selected so as not to exceed a flattening point of a raw axle torque output request of the powertrain.

7. The pedal map compensation system of claim 1, wherein the distance between the calibratable lower split point and the calibratable upper split point along the modified system output is shaped to include one of the following: a linear shaping profile and a non-linear shaping profile.

8. The pedal map compensation system of claim 1, wherein the vehicle is a battery electric vehicle (BEV) and the at least one system blending input includes a state-of-charge and a temperature of a rechargeable battery pack.

9. The pedal map compensation system of claim 1, wherein the vehicle includes an internal combustion engine and the at least one system blending input includes altitude and at least one of the following: engine coolant temperature and engine intake temperature.

10. The pedal map compensation system of claim 1, wherein the vehicle is a hybrid vehicle and the at least one system blending input includes a state-of-charge of a rechargeable battery pack, a temperature of the rechargeable battery pack, altitude, engine coolant temperature, and engine intake temperature.

11. The pedal map compensation system of claim 1, wherein the at least one system blending input includes more than one input, and wherein the one or more controllers execute instructions to:

select the system blending input associated with a lowest maximum axle torque output value of the powertrain of the vehicle.

12. The pedal map compensation system of claim 1, wherein the one or more controllers perform the filtering and rate limiting by:

applying a time-based rate limit to an unfiltered profile of the maximum axle torque output value of the powertrain associated with the at least one system blending input to determine a rate limited signal; and filtering the rate limited signal to determine a filtered, rate limited signal, wherein the modified maximum system capacity is equal to the filtered, rate limited signal.

13. The pedal map compensation system of claim 12, wherein the one or more controllers execute instructions to:

compare the filtered, rate limited signal with the calibratable lower split point of the modified pedal map; and in response to determining the filtered, rate limited signal is less than the calibratable lower split point of the modified pedal map, utilize the raw system torque output of the unmodified pedal map.

14. The pedal map compensation system of claim 12, wherein the one or more controllers execute instructions to:

compare the filtered, rate limited signal with the raw maximum system capacity of the unmodified pedal map; and in response to determining the filtered, rate limited signal is greater than the raw maximum system capacity of the unmodified pedal map, utilize the raw system torque output of the unmodified pedal map instead of the modified system output.

15. A pedal map compensation system for a vehicle, the pedal map compensation system comprising:

one or more controllers that include one or more processors that execute instructions to:

receive an accelerator pedal position of an accelerator pedal, a vehicle speed signal, and a signal indicating an active driver mode of the vehicle;

select an unmodified pedal map saved in memory of the controller based on the active driver mode, wherein the unmodified pedal map includes a dead pedal region representing an area of a raw system torque output where the accelerator pedal continues to be depressed without the vehicle generating a corresponding increase in output axle torque, and wherein the dead pedal region is created when the raw system torque output is limited by a raw maximum system capacity of the unmodified pedal map;

receive at least one system blending input that depends upon a specific powertrain configuration of the vehicle, wherein each system blending input is associated with a maximum axle torque output value of a powertrain of the vehicle;

perform filtering and rate limiting with respect to the maximum axle torque output value of the powertrain associated with the at least one system blending input to determine a modified maximum system capacity of a modified pedal map;

receive input indicating a calibratable lower split point and a calibratable upper split point of a modified system output of the modified pedal map, wherein a distance measured between the calibratable lower split point and the calibratable upper split point of the modified system output of the modified pedal map represents a region where a profile of the raw system torque output of the unmodified pedal map is shaped to reduce the dead pedal region;

receive a signal indicating one pedal driving is selected by a driver of the vehicle;

in response to receiving the signal indicating one pedal driving is selected, decrease a value of a zero pedal torque of the modified pedal map;

limit the modified system output of the modified pedal map based on a maximum torque limit of the powertrain, one or more hardware protection limits, and one or more maximum powertrain system limits; and instruct the powertrain of the vehicle to generate output axle torque as defined by the modified pedal map.

16. The pedal map compensation system of claim 15, wherein the one or more controllers perform the filtering and rate limiting by:

applying a time-based rate limit to an unfiltered profile of the maximum axle torque output value of the powertrain associated with the at least one system blending input to determine a rate limited signal; and filtering the rate limited signal to determine a filtered, rate limited signal, wherein the modified maximum system capacity is equal to the filtered, rate limited signal.

17. The pedal map compensation system of claim 15, wherein the one or more controllers execute instructions to:

compare the filtered, rate limited signal with the calibratable lower split point of the modified pedal map; and in response to determining the filtered, rate limited signal is less than the calibratable lower split point of the modified pedal map, utilize the raw system torque output of the unmodified pedal map.

18. The pedal map compensation system of claim 15, wherein the one or more controllers execute instructions to:

compare the filtered, rate limited signal with the raw maximum system capacity of the unmodified pedal map; and in response to determining the filtered, rate limited signal is greater than the raw maximum system capacity of the unmodified pedal map, utilize the raw system torque output of the unmodified pedal map instead of the modified system output.

19. The pedal map compensation system of claim 15, wherein the vehicle is a BEV and the at least one system blending input includes a state-of-charge and a temperature of a rechargeable battery pack.

20. A pedal map compensation system for a vehicle, the pedal map compensation system comprising:

one or more controllers that include one or more processors that execute instructions to:

receive an accelerator pedal position of an accelerator pedal, a vehicle speed signal, and a signal indicating an active driver mode of the vehicle;

select an unmodified pedal map saved in memory of the controller based on the active driver mode, wherein the unmodified pedal map includes a dead pedal region representing an area of a raw system torque output where the accelerator pedal continues to be depressed without the vehicle generating a corresponding increase in output axle torque, and wherein the dead pedal region is created when the raw system torque output is limited by a raw maximum system capacity of the unmodified pedal map;

receive at least one system blending input that depends upon a specific powertrain configuration of the vehicle, wherein each system blending input is associated with a maximum axle torque output value of a powertrain of the vehicle;

perform filtering and rate limiting with respect to the maximum axle torque output value of the powertrain associated with the at least one system blending input to determine a modified maximum system capacity of a modified pedal map, wherein the one or more controllers perform the filtering and rate limiting by:

applying a time-based rate limit to an unfiltered profile of the maximum axle torque output value of the powertrain associated with the at least one system blending input to determine a rate limited signal; and filtering the rate limited signal to determine a filtered, rate limited signal, wherein the modified maximum system capacity is equal to the filtered, rate limited signal;

receive input indicating a calibratable lower split point and a calibratable upper split point of a modified system output of the modified pedal map, wherein a distance measured between the calibratable lower split point and the calibratable upper split point of the modified system output of the modified pedal map represents a region where a profile of the raw system torque output of the unmodified pedal map is shaped to reduce the dead pedal region;

receiving a signal indicating one pedal driving is selected by a driver of the vehicle;

in response to receiving the signal indicating one pedal driving is selected, decrease a value of a zero pedal torque of the modified pedal map;

limit the modified system output of the modified pedal map based on a maximum torque limit of the powertrain, one or more hardware protection limits, and one or more maximum powertrain system limits; and instruct the powertrain of the vehicle to generate output axle torque as defined by the modified pedal map.

* * * * *